US010597856B2

(12) United States Patent
Guthrie

(10) Patent No.: US 10,597,856 B2
(45) Date of Patent: Mar. 24, 2020

(54) ELECTRONIC FILL VALVE AND ASSEMBLY

(71) Applicant: LAVELLE INDUSTRIES, INC., Burlington, WI (US)

(72) Inventor: Kevin J. Guthrie, Wind Lake, WI (US)

(73) Assignee: LAVELLE INDUSTRIES, INC., Burlington, WI (US)

( * ) Notice: Subject to any disclaimer, the term of this patent is extended or adjusted under 35 U.S.C. 154(b) by 375 days.

(21) Appl. No.: 15/390,963

(22) Filed: Dec. 27, 2016

(65) Prior Publication Data

US 2017/0183852 A1  Jun. 29, 2017

Related U.S. Application Data

(60) Provisional application No. 62/271,767, filed on Dec. 28, 2015.

(51) Int. Cl.
| | | |
|---|---|---|
| *F16K 31/34* | (2006.01) | |
| *E03D 1/32* | (2006.01) | |
| *F16K 31/06* | (2006.01) | |
| *F16K 21/18* | (2006.01) | |
| *F16K 37/00* | (2006.01) | |

(52) U.S. Cl.
CPC ............. *E03D 1/32* (2013.01); *F16K 21/185* (2013.01); *F16K 31/06* (2013.01); *F16K 31/0655* (2013.01); *F16K 31/0675* (2013.01); *F16K 31/34* (2013.01); *F16K 37/005* (2013.01); *Y10T 137/7472* (2015.04)

(58) Field of Classification Search
CPC .. E03D 1/32; E03D 1/30; E03D 1/306; F16K 37/005; F16K 21/185; F16K 31/06; F16K 31/0655; F16K 31/0675; F16K 31/0682; F16K 31/34; Y10T 137/7472; Y10T 137/7475; Y10T 137/7368–7378; Y10T 137/7413; Y10T 137/7306; G05D 9/12; Y10S 165/005; F16H 57/0449; B01D 36/005; B67D 7/465; B67D 7/52; A47L 2401/09; C02F 2209/42
USPC .... 137/392, 485, 487.5, 558, 426, 412–415; 251/30.01, 30.03, 30.05, 129.2, 25–47, 251/231, 228; 222/56, 63, 64, 65; 4/415, 4/427; 340/605
See application file for complete search history.

(56) References Cited

U.S. PATENT DOCUMENTS

| | | | | |
|---|---|---|---|---|
| 1,346,898 | A * | 7/1920 | Kingsbury | G01F 23/243 137/392 |
| 2,329,254 | A * | 9/1943 | Dorman | F16K 31/10 251/30.01 |
| 4,586,013 | A * | 4/1986 | Linkner, Jr. | H01F 7/13 251/129.2 |
| 5,247,710 | A | 9/1993 | Carder et al. | |
| 5,771,917 | A * | 6/1998 | Carney | F15B 21/06 134/166 C |

(Continued)

*Primary Examiner* — Craig J Price
(74) *Attorney, Agent, or Firm* — Joseph S. Heino; Erin E. Kaprelian

(57) ABSTRACT

A fill valve for a water storage tank, the fill valve comprising a riser assembly, a valve housing mounted on an upper end of the riser assembly, a pilot orifice in the valve housing, and a sensor adapted to be mounted within the water storage tank. The sensor is responsive to a water level within the water storage tank, and a pilot valve mechanism opens and closes the pilot orifice in response to the sensor determining the water level in the fill tank.

15 Claims, 7 Drawing Sheets

(56) References Cited

U.S. PATENT DOCUMENTS

| | | | | |
|---|---|---|---|---|
| 5,954,311 | A * | 9/1999 | Thorpe | F16K 31/082 251/30.03 |
| 6,058,519 | A * | 5/2000 | Quintana | E03D 1/00 4/427 |
| 6,095,178 | A * | 8/2000 | Gilbert | F16K 21/18 137/197 |
| 6,671,893 | B1 * | 1/2004 | Quintana | E03D 3/00 4/427 |
| 6,877,170 | B1 * | 4/2005 | Quintana | E03D 1/00 4/427 |
| 6,913,035 | B2 * | 7/2005 | Huang | E03D 1/32 137/425 |
| 6,934,977 | B1 * | 8/2005 | Quintana | E03D 1/00 4/427 |
| 7,096,522 | B2 | 8/2006 | Hirtriter | |
| 7,757,708 | B1 | 7/2010 | Canfield et al. | |
| 8,066,029 | B2 * | 11/2011 | McDonald | E03B 7/071 137/386 |
| 8,209,792 | B1 * | 7/2012 | Quintana | E03D 1/00 4/427 |
| 8,166,996 | B2 | 9/2012 | Canfield et al. | |
| 8,453,992 | B2 * | 6/2013 | Palmer | F16K 31/42 251/129.16 |
| 8,534,313 | B1 | 9/2013 | Achterman | |
| 8,695,620 | B2 * | 4/2014 | Bush | E03D 5/02 137/15.11 |
| 8,973,612 | B2 | 3/2015 | Sawaski et al. | |
| 9,464,420 | B2 * | 10/2016 | Magar | E03D 1/00 |
| 10,041,240 | B2 | 8/2018 | Liu | E03D 1/32 |
| 10,132,067 | B2 * | 11/2018 | Liu | E03D 1/32 |
| 2003/0145371 | A1 * | 8/2003 | Ghertner | E03D 1/00 4/427 |
| 2004/0025238 | A1 * | 2/2004 | Parsons | E03D 1/00 4/378 |
| 2004/0232370 | A1 * | 11/2004 | Parsons | E03C 1/057 251/129.04 |
| 2005/0062004 | A1 * | 3/2005 | Parsons | E03C 1/05 251/129.04 |
| 2008/0209622 | A1 * | 9/2008 | Wood | E03D 1/36 4/415 |
| 2015/0323097 | A1 * | 11/2015 | Stoltz | E03D 11/00 137/2 |
| 2017/0168508 | A1 * | 6/2017 | Bush | E03D 9/00 |
| 2018/0216742 | A1 * | 8/2018 | Korten | F16K 1/526 |
| 2019/0086890 | A1 * | 3/2019 | Bradley | G05B 19/048 |

* cited by examiner

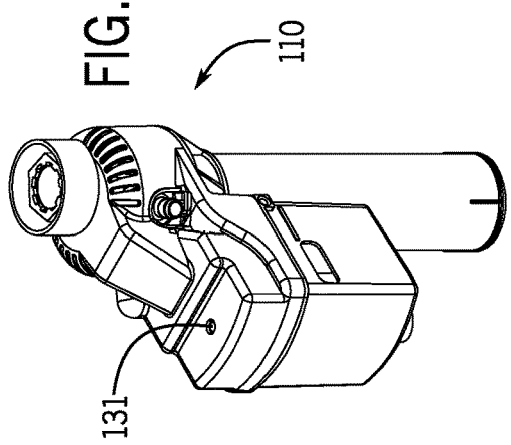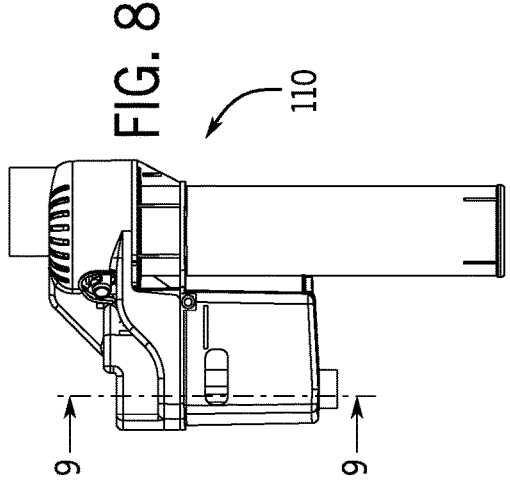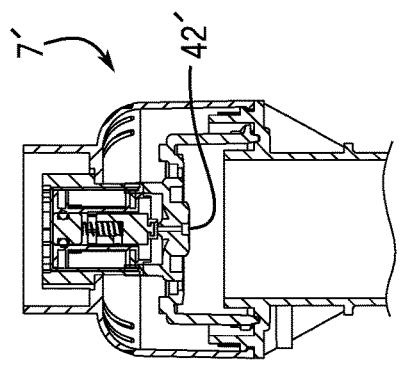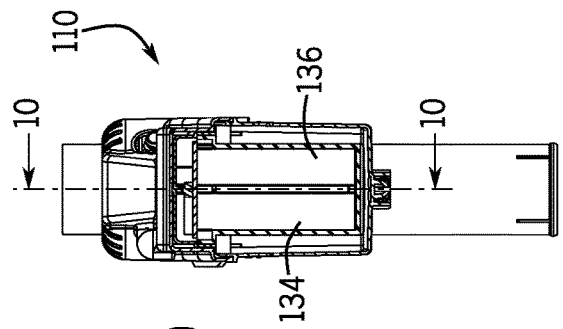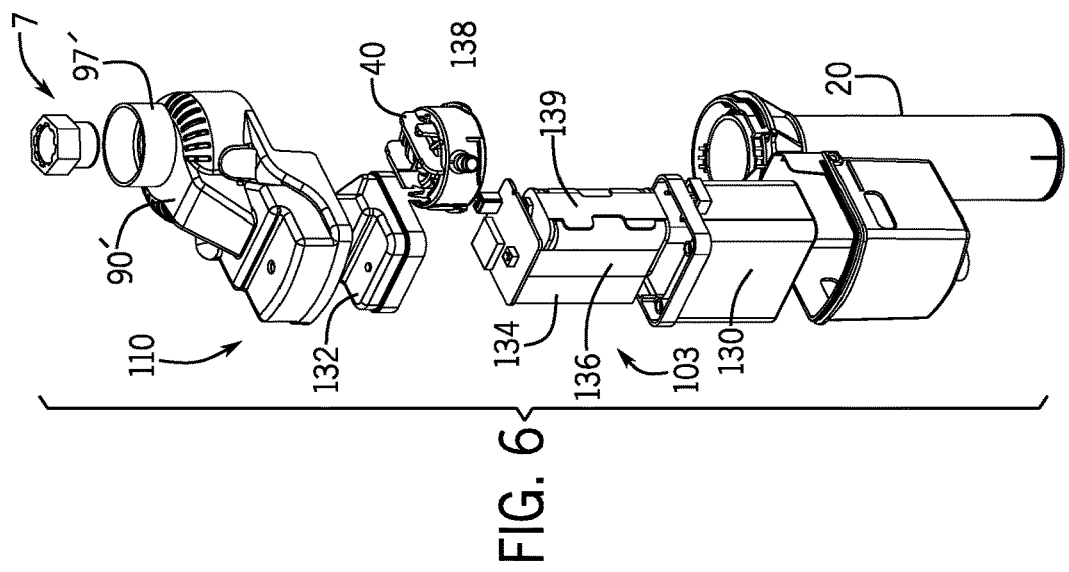

ELECTRONIC FILL VALVE AND ASSEMBLY

FIELD OF THE DISCLOSURE

The present disclosure relates generally to plumbing fixtures and the component parts that are used in them. More particularly, it relates to an improved fill valve and assembly for flush systems used in gravity flush toilets.

BACKGROUND OF THE INVENTION

Conventional toilets typically employ a generally rectangular porcelain tank mounted immediately above a porcelain bowl from which a quantity of water is rapidly drained in order to flush waste from the bowl into the sewer system. Common designs use a flapper valve made of an elastomeric material that covers the drain outlet of the tank. When the flush handle on the outside of the tank is manually depressed, the flapper valve is lifted and the head of water in the tank drains through the drain outlet into the bowl, thereby flushing the contents of the bowl into the sewer system. The flapper valve is typically designed with an inverted air chamber so that it initially floats as it is lifted away from the drain outlet in the bottom of the tank. This allows sufficient flushing water to flow into the bowl even if the user immediately releases the flush handle. When the water level in the tank drops, the tank is automatically refilled through a fill valve connected to a high pressure water supply line.

The typical fill valve comprises a ballcock or pilot fill valve mounted in the tank on top of a riser assembly which extends through an opening in the bottom of the tank and is connected to a pressurized water line. When the tank drains, a float connected to the ballcock or pilot fill valve descends. This activates the ballcock or pilot fill valve and it allows the tank to refill with water at a rate much slower than the rate at which water flows through the drain outlet. When the tank is nearly empty, the flapper valve closes. At the same time water from the ballcock or pilot fill valve enters an overflow tube and refills the bowl to the normal standing water level to provide a trap seal. Once the float reaches a predetermined height indicating that the tank is full, the ballcock or pilot fill valve completely shuts off the water flow into the tank.

The foregoing general conventional arrangement is widely used today. One pilot fill valve construction that was devised and has achieved wide market acceptance and success is disclosed in U.S. Pat. No. 6,003,541 titled "Unitary Float and Arm for Float Operated Valve." Other fill valves of related construction include U.S. Pat. No. 5,975,125 titled "Combined Filter and Noise Suppressor for Fill Valve;" U.S. Pat. No. 5,836,346 titled "Pilot Operated Diaphragm Fill Valve;" U.S. Pat. No. 5,715,859 titled "Adjustable Fill Vale Assembly;" and, more recently, U.S. Pat. Nos. 8,387,652 and 9,062,795 both titled "Water Saver Fill Valve and Assembly" both being disclosures of this inventor. The disclosures relative to each of the foregoing constructs are incorporated herein by reference.

Fill valves made in accordance with the foregoing construction include a riser assembly, a valve housing mounted on an upper end of the riser assembly, and a pilot operated diaphragm valve mounted in the valve housing. A float housing is connected to the valve housing. A float arm of a combination float and float arm has a first end pivotally connected to the valve housing for opening and closing a pilot orifice in the diaphragm valve. A second end of the float arm is connected to the float. The float is located in the float housing which has an inlet opening for allowing water to spill into the float housing so that the float rises upwardly and the first end of the float arm fully seals off the pilot orifice.

SUMMARY OF THE DISCLOSURE

The improved fill valve and assembly of the present disclosure comprises some elements of a conventional fill valve of the type that is described above. That is, it has a float housing which has an inlet opening for allowing water to rise within the float housing. Instead of a float being disposed within the float housing, however, certain low energy digital components are disposed within the float housing and in the vicinity of the pilot orifice that is disposed within the fill valve cap. In accordance with the present disclosure, the digital technology can use one of two electronic fill valve (or "EFV") constructs. A first construct is for resistive sensing and a second construct is for capacitive sensing. In both constructs, the float housing provides a reservoir for holding a battery enclosure, a waterproof battery enclosure cover, and a PC board with a logic and control module as well as a receiver and a transmitter.

As alluded to, a standard fill valve cap of the type used in the references is incorporated into the EFV and assembly of the present disclosure. That includes a pilot seat and a pilot orifice. However, in one embodiment, opening and closing the pilot orifice is accomplished via use of a solenoid and plunger arrangement, or, in another embodiment, a solenoid and pivot arm. Wireless technology is used to allow the solenoid to "communicate" with the digital control elements that are disposed within the float housing.

The foregoing and other features of the electronic fill valve and assembly of the present disclosure will be apparent from the following detailed description when read in conjunction with the accompanying drawings.

BRIEF DESCRIPTION OF THE DRAWINGS

FIG. 6 is a top, front and right side perspective, and partially exploded, view of an alternative capacitive sensing embodiment of the EFV of the present disclosure.

FIG. 7 is the same view shown in FIG. 6 but showing the EFV as assembled.

FIG. 8 is a right side elevation view of the EFV shown in FIGS. 6 and 7.

FIG. 9 is a partially sectioned front elevation view of the EFV shown in FIGS. 6-8 but taken along line 9-9 of FIG. 8.

FIG. 10 is a partially sectioned view similar to FIG. 8 but taken along line 10-10 of FIG. 9.

DETAILED DESCRIPTION

Figure 1:
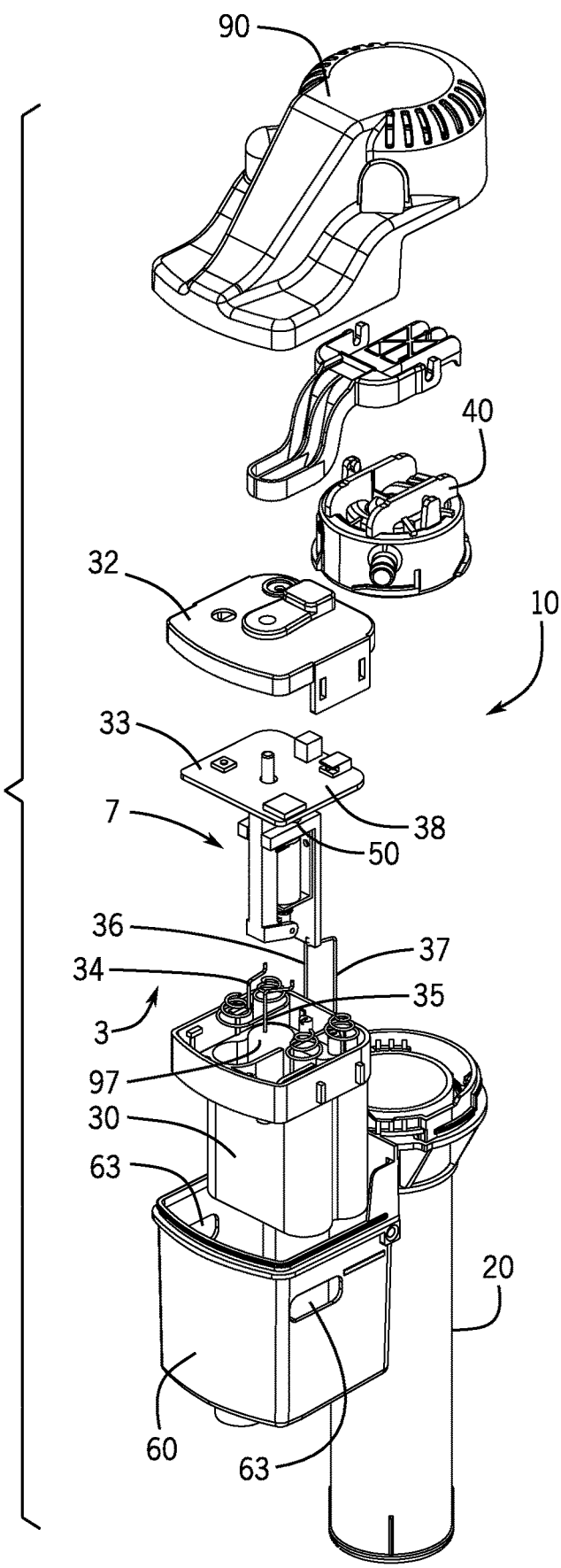
FIG. 1 is a top, front and right side perspective, and partially exploded, view of a resisting sensing embodiment, which is a first embodiment, of the EFV of the present disclosure.

Referring now to the drawings in detail, wherein like-numbered elements refer to like elements throughout, FIGS. 1-5 illustrate an electronic fill valve (or "EFV") constructed in accordance with a first preferred embodiment of the disclosure, and FIGS. 6-10 illustrate an EFV constructed in accordance with a second preferred embodiment of the disclosure. As previously alluded to, the first preferred embodiment is drawn to a "resistive sensing" functionality, and the second preferred embodiment is drawn to a "capacitive sensing" functionality. Referring first to the resistive sensing functionality, the EFV, generally identified 10 in FIGS. 1-5, will be used in conjunction with a standard flush lever, flush valve and flapper (not shown, but collectively, the "assembly") adapted to be used in a water storage tank (not shown). Structurally, the EFV 10 is configured to work within a standard fill valve (which is a Lavelle Industries, Inc. Model 528 fill valve), a part of which is a float housing 60 having at least one aperture 63 defined in it, with water filling and draining thru the no check ball hole at the bottom of the float chamber on the EFV. The EFV is attached to the top of a riser assembly 20. The EFV 10 is also configured to work with a standard fill valve cap 40 (which is a Lavelle Industries, Inc. Model 528 valve cap) and a slightly modified cover 90. The EFV 10 comprises two subassemblies, a sensing and control subassembly, generally identified 3, and a solenoid subassembly, generally identified 7 in the first embodiment and 7' in the second embodiment.

Figure 1A:
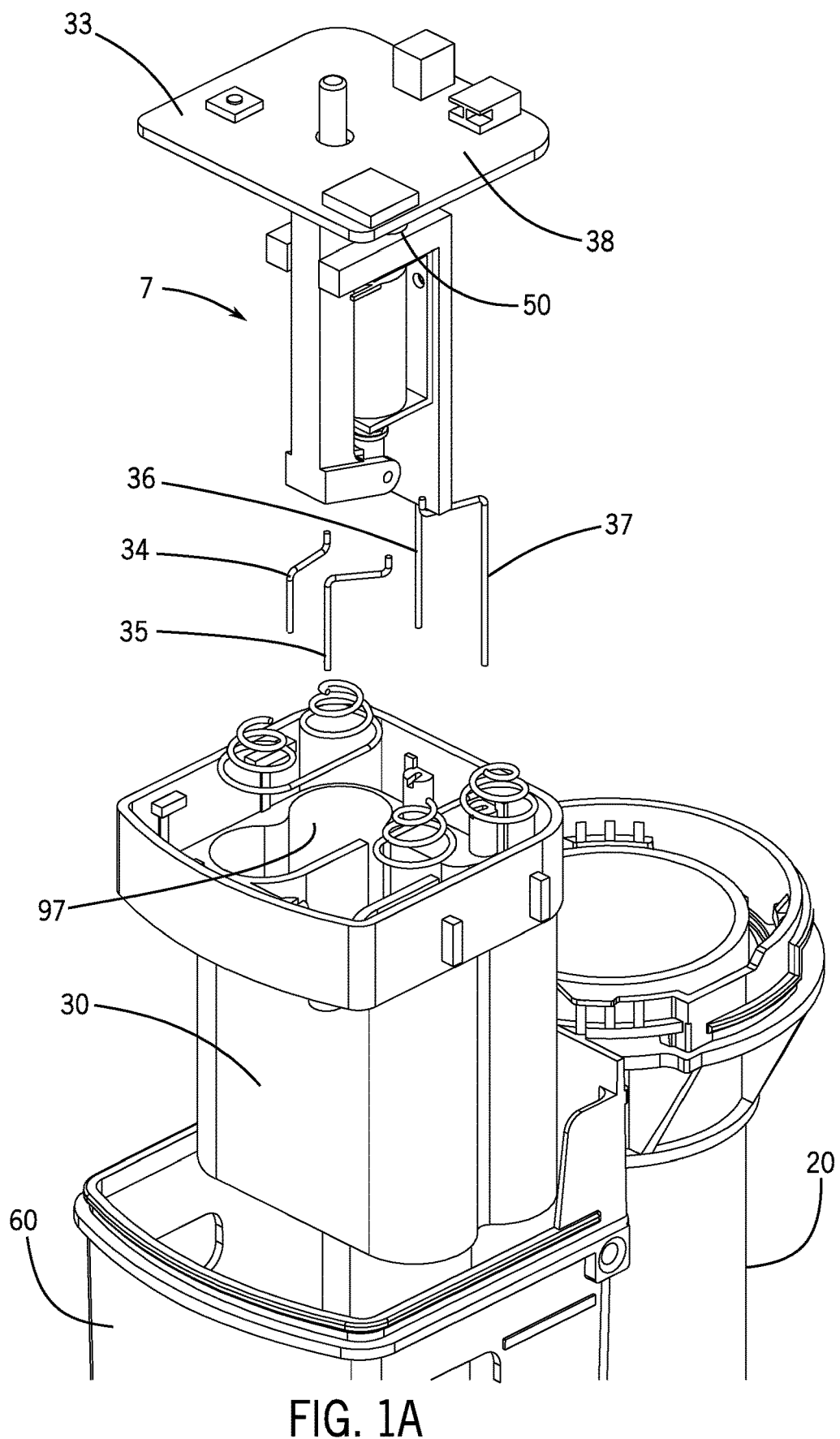
FIG. 1A is a partial enlargement of the EFV shown in FIG. 1.
Figure 3:
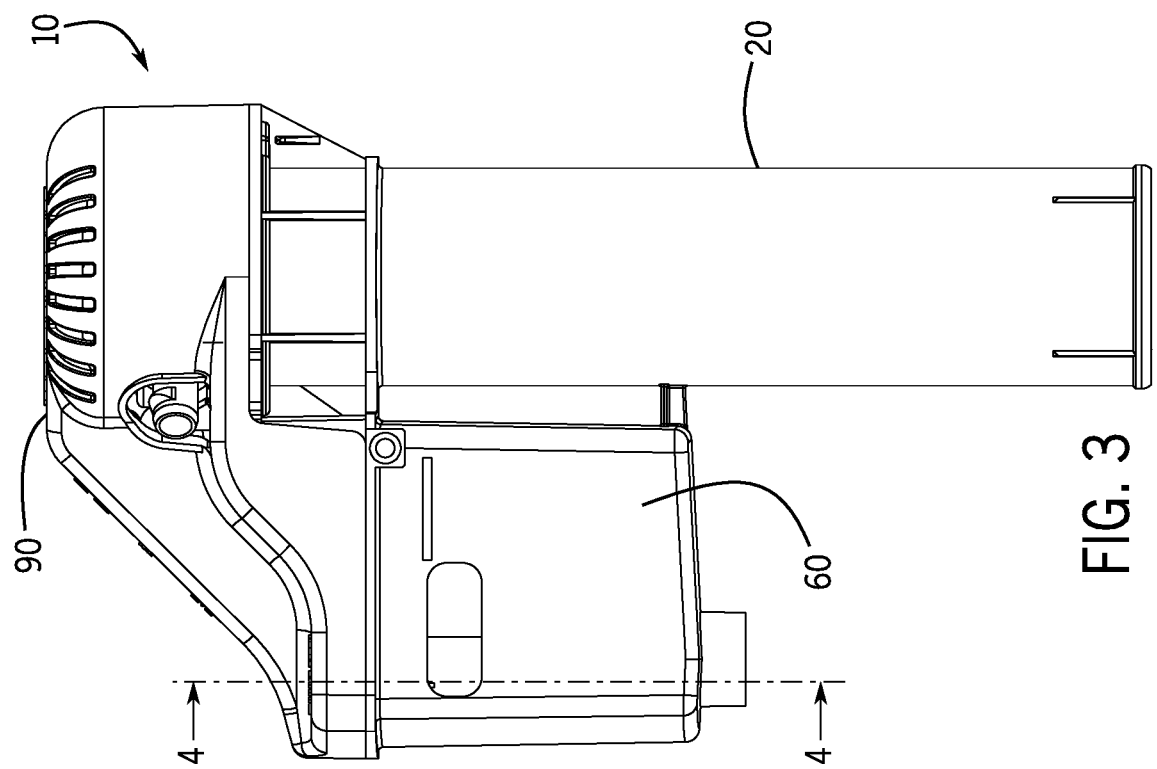
FIG. 3 is a right side elevation view of the EFV shown in FIGS. 1 and 2.
Figure 2:
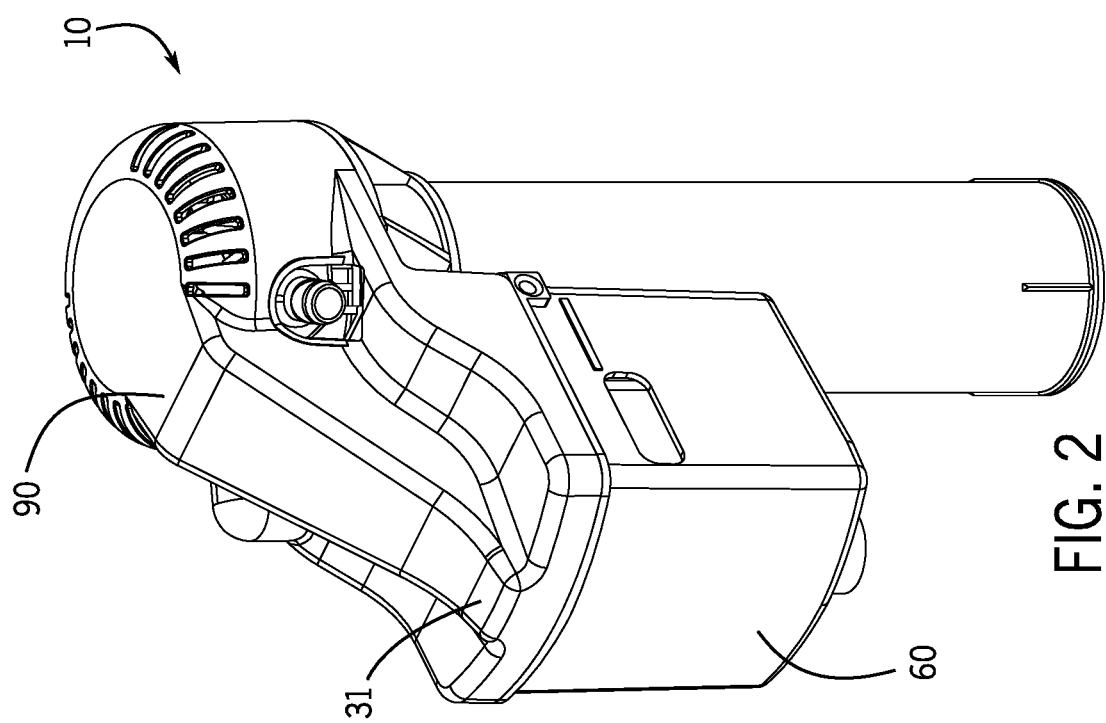
FIG. 2 is the same view shown in FIG. 1 but showing the EFV as assembled.
Figure 4:
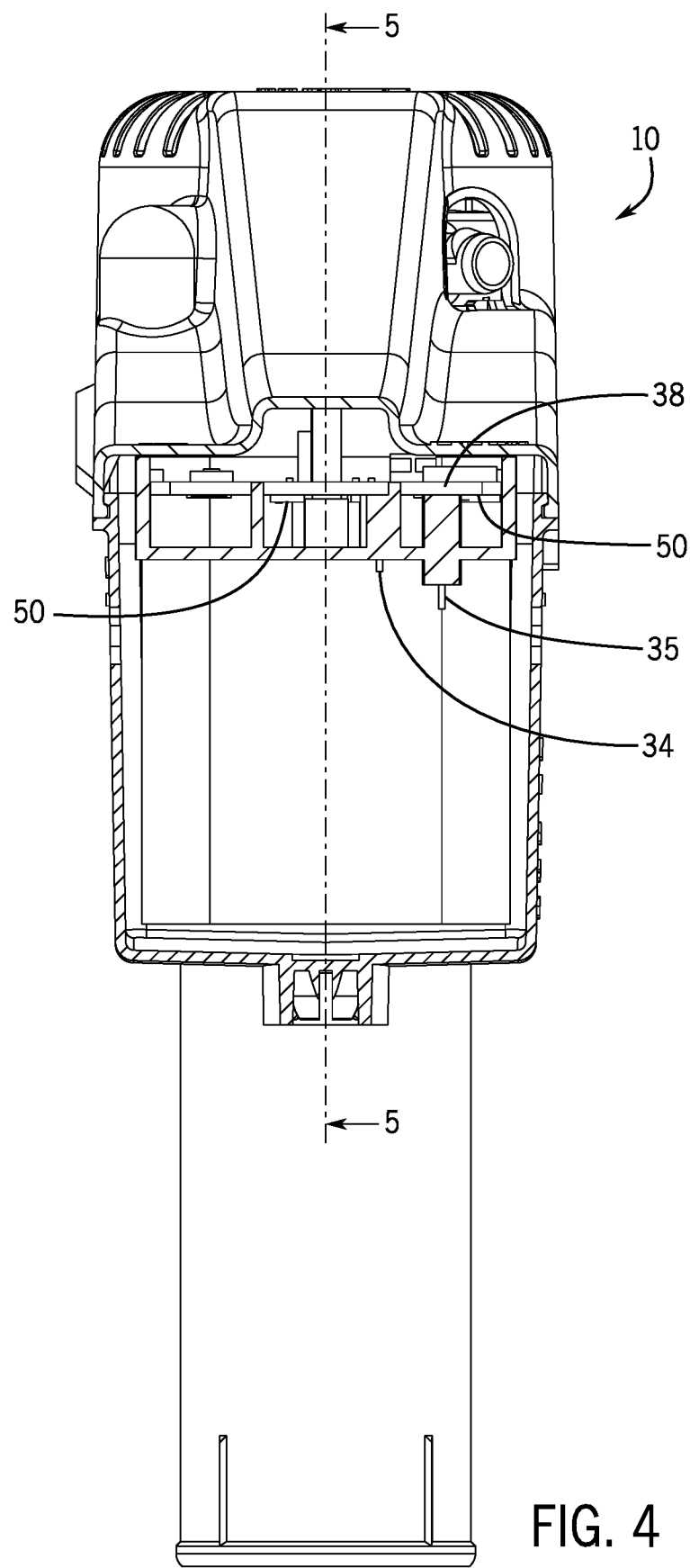
FIG. 4 is a partially sectioned front elevation view of the EFV shown in FIGS. 1-3 taken along line 4-4 of FIG. 3.

The sensing and control subassembly 3 of the EFV 10 comprises a battery enclosure 30 configured to house four "AA" batteries, although the present disclosure is not so limited, and a liquid tight battery enclosure cover 32. Disposed atop the battery holder is a PC board 38 which comprises circuitry for enabling a logic and control module, as well as a wireless receiver/transmitter component. Disposed atop the PC board 38 is a reset switch 33. The reset switch 33 corresponds to a reset button 31 within the cover 90. See FIG. 2. Forwardly in the battery enclosure 30 and making contact with the PC board 38 are the water sensors, as further described below, a water over-flow rod 34, a water off rod 35, a water on rod 36 and a ground rod 37. The rods 34, 35, 36, 37 may contact the PC board 38 at a plurality of contact pads 50. Contact pads 50, as shown in FIGS. 1, 1A and 4, may be made of any conductive material known in the art, and rods 34, 35, 36, 37 may be permanently coupled thereto (by, e.g. soldering) or may be touch-coupled to the contact pads 50, such that removal of the PC board 38 breaks the contact between the rods 34, 35, 36, 37 and the contact pads 50.

As is known, the resistance or capacitance between the rods changes based on whether or not water is present between a respective rod and the ground rod. This resistance or capacitance is what is used to sense whether the water level in the tank has reached various levels along the rods.

Figure 5:
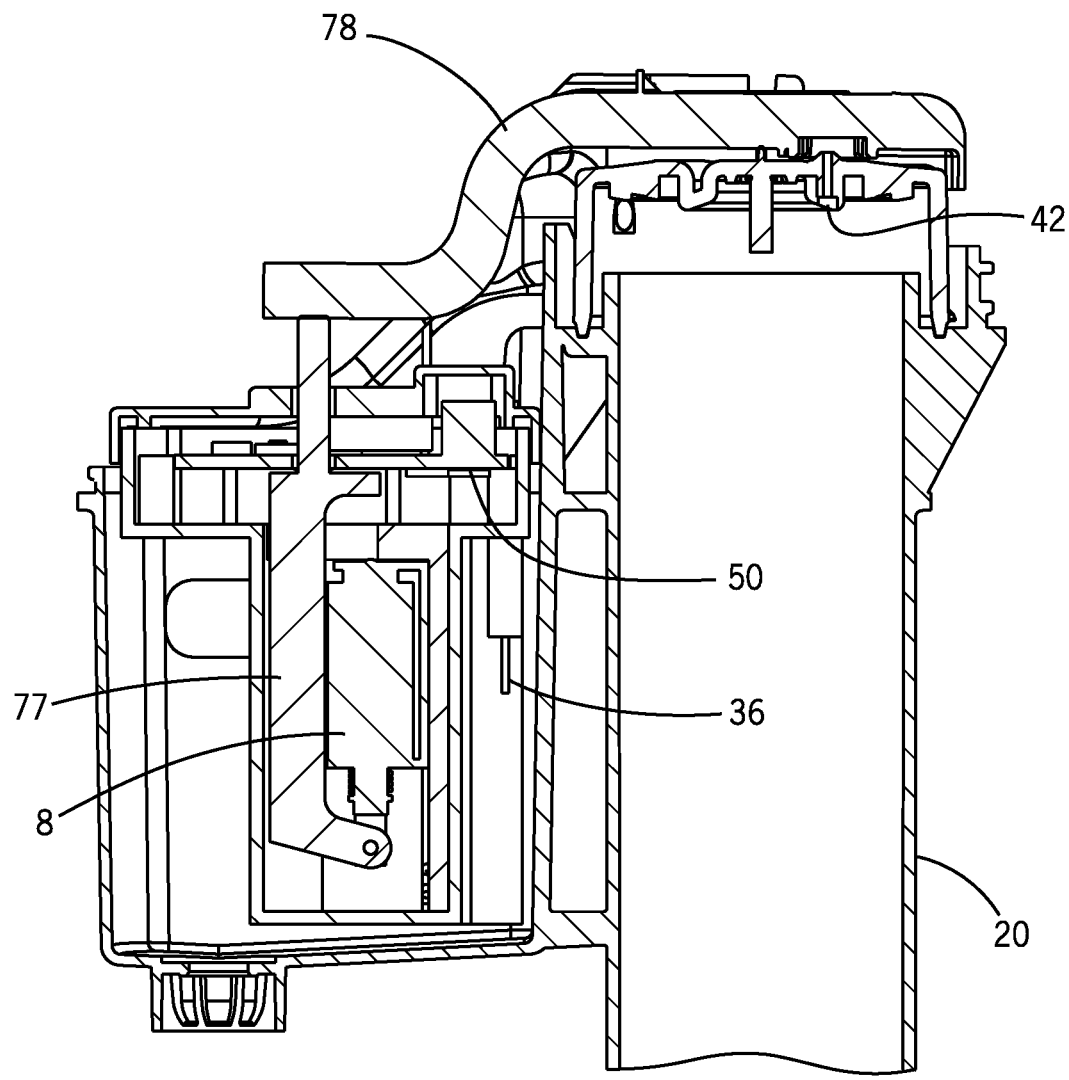
FIG. 5 is a partially sectioned view similar to FIG. 3 but taken along line 5-5 of FIG. 4.

The solenoid subassembly 7 of the EFV 10 is disposed within a cavity 97 defined within the float housing. As shown in FIG. 5, the solenoid subassembly 7 includes a solenoid 8 and pilot valve means for opening and closing the pilot orifice in response to the water level in the fill tank in the form of the solenoid 8 that interacting via a connecting link 77 with an arm 78 pivotally mounted on the top of the valve housing, the arm interacting with the pilot orifice 42 of the fill valve cap 40.

In the second embodiment illustrated in FIGS. 6-10, a solenoid subassembly 7' of an EFV 110 is disposed within an uppermost cavity 97 defined within the cover 90. This subassembly 7' comprises a magnet, a spring, a coil and a plunger. The plunger is a component which interacts with the pilot orifice 42 of the fill valve cap 40. See FIG. 10. Either solenoid assembly can be used with either the rods or the plates, described below.

In both embodiments, the EFV works on a platform that receives and sends messages wirelessly between the sensors and the solenoid subassembly. The EFV is thus a wireless "smart" valve that uses low energy digital technology and BlueTooth®, iBeacon™, or other short-wavelength ultra-high frequency (or "UHF") radio wave technology in the industrial, scientific and medical (or "ISM") band ranging from 2.4 to 2.485 GHz (BLUETOOTH is a registered certification mark of Bluetooth sig., Inc. and IBEACON is a trademark of Apple Inc.); radio frequency ("RF" and "RFID") technology; and/or other electronic data transmitting and receiving platforms.

The EFV 10 does not use a check ball in the floor of the float chamber 60, so the float chamber 60 can fill and drain as the waterline rises and falls.

The EFV 10 uses a normally closed latching solenoid 7. When the circuit is closed, the plunger is forward and the spring keeps the pilot orifice 42 closed. If the battery life is lost, the valve 10 will stay closed. Further the EFV 10 will chirp when batteries are low. As alluded to above, the EFV 10 has four rods 34, 35, 36, 37, which could be fabricated from aluminum, stainless steel, carbon fiber, conductive peek or some combination thereof. The overflow rod 34 determines if the EFV 10 has failed to shut off.

The EFV 10 also has slow leak detection. That is, if water loses contact with the water off rod 35 and does not come in contact with the longer rods 36, 37 within a preprogrammed period of time, such as three (3) seconds, this condition will be detected as a slow leak and send a message to the owner or may have an audible sound. Because it is "smart," the EFV 10 can be turned off remotely if in this mode.

The EFV 10 also has catastrophic leak detection. If water does not reach the tall rod 36 during the fill cycle in another preprogrammed period of time, this will be detected and processed by the PC 38 as a catastrophic leak and send a message to the owner, or, in the alternative, or in addition thereto, be an audible sound. Because it is "smart," EFV 10 can be turned off remotely, if in this mode, as well. Lastly, the EFV 10 has over flow detection. That is, if water comes in contact with the overfill rod 34 and it indicates a high water level has been reached, the EFV 10 will send a major warning message or may have an audible sound.

The micro-processor within the PC 38 is programmed with an algorithm which learns the flushing pattern of each toilet (i.e., a "pattern" is determined when water comes into contact with the long and short rods). This pattern is then considered "normal" operation for this particular toilet (not shown). If the pattern is broken, an alarm can be sent or may have an audible sound. A reset button 31 is included on the EFV 10 as described above. Functionally, and once the reset button 31 is pushed, the memory is cleared and the flushing pattern will need to be relearned.

The EFV 10 can also be treated as a stand-alone fill valve with no "smart" module or functionality. In this case, the homeowner would be notified audibly for low battery life, slow leak, catastrophic leak, overflow and irregular flushing pattern.

Referring now to the capacitive sensing functionality, the EFV, generally identified 110 in FIGS. 6-10, can also be used in conjunction with a standard flush lever, flush valve and flapper (not shown and, collectively, the "assembly"). The EFV 110 is configured to work within a standard fill valve 20 (the Model 528 referred to previously) having a float tank 60 and an aperture 63. The EFV 110 is also configured to work with a standard fill valve cap 40 (again, the Model 528 valve cap) and a slightly modified cover 90. The EFV 110 comprises two subassemblies, a sensing and control subassembly, generally identified 103, and the solenoid subassembly 7', the latter being of the type previously described relative to the resistive sensing embodiment.

The sensing and control subassembly 103 of the EFV 10 comprises a battery enclosure 130, a liquid tight battery enclosure cover 132 and a battery holder 139, the battery holder 139 being configured to house four "AA" batteries, although this embodiment is not limited in that regard. Disposed atop the battery holder is a PC board 138 which comprises circuitry for enabling a logic and control module as well as a wireless receiver/transmitter component. Disposed atop the PC board 138 is a reset switch 133. The reset switch 133 corresponds to a reset button 131 within the cover 90. See FIG. 7. Forwardly of the battery enclosure 130 and extending downwardly from the PC board 138 is a pair of capacitive electrodes 134, 136.

Figure 12:
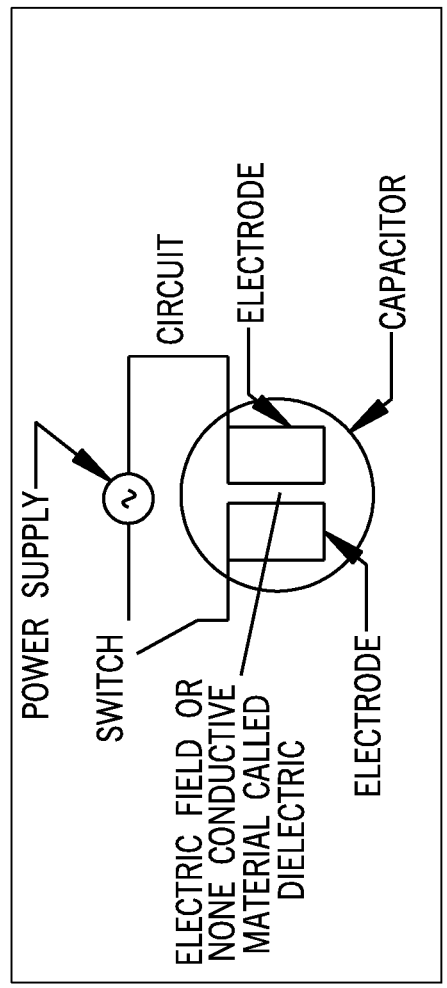
FIG. 12 is a schematic electrical drawing of the circuitry used in the capacitive embodiment.

This capacitive EFV 110 likewise works as a wireless "smart" valve. It does not use a check ball, so the float chamber 60 can fill and drain as the waterline rises and falls. The EFV 110 likewise uses a normally closed solenoid 7. However, the capacitive EFV 110 has two plates or electrodes, 134, 136 (also constructed of aluminum, stainless steel, carbon fiber, conductive peek or any combination) disposed inside the plastic enclosure. As water (which is a dielectric medium) rises and lowers, the measured capacitance, in pico farads, increases and decreases. Distances on the plates 134, 136 can be associated with overflow, shut-off, turn on, etc. The schematic circuit diagram shown in FIG. 12 illustrates the general lay-out for the EFV 110.

Figure 11:
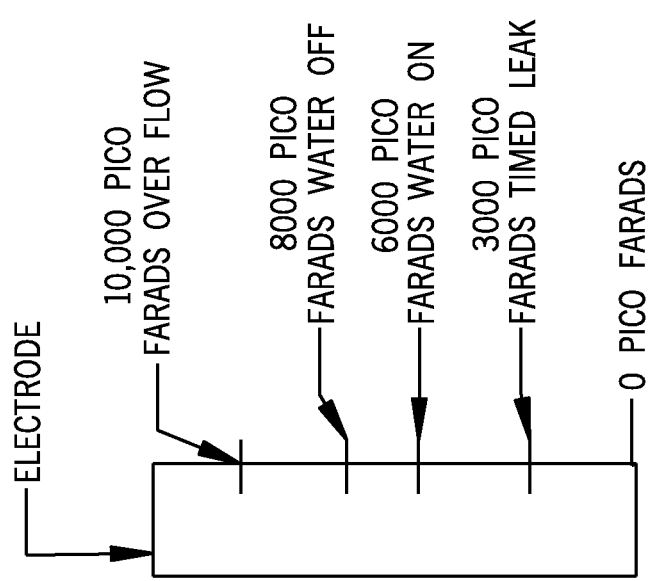
FIG. 11 is a simplified graphic diagram of the capacitive electrode used in the capacitive embodiment.

In application, the capacitive EFV 110 indicates slow leak detection if water leaves the 8000 pico farads, as shown in FIG. 11, and drops to 6000 pico farads between 10 seconds and 60 seconds, which will send a message to the owner or may have an audible sound. The EFV 110 provides the option of turning the valve off, if "smart." The capacitive EFV 110 also comprises catastrophic leak detection, if water leaves the 8000 pico farads and drops to 3000 pico farads between 10 seconds and 20 seconds, which will send a message to the owner or may have an audible sound. Again, this system has the option of turning the valve off if "smart." EFV has over flow detection, if water rises up to the 10,000 pico farads mark, the EFV will send a major warning message or may have an audible sound. The micro-processor is programmed with an algorithm that learns the flushing "pattern" of each toilet. (a pattern is when water moves between 8000 and 6000 pico farads). This pattern is then considered normal. If the pattern is broken, an alarm can be sent or may have an audible sound. The system has a reset button on the capacitive EFV 110. Once the reset is pushed, the memory is cleared and the flushing pattern will need to be relearned. The capacitive EFV 110 can also be treated as a stand alone fill valve with no smart module. In this case, the homeowner would be notified audibly for low battery life, slow leak, catastrophic leak, overflow and irregular flushing pattern.

This disclosure also relates to a fill valve and assembly that prevents water wastage. More specifically, it also relates to an improved electronic fill valve (or "EFV") and assembly of the type that incorporates low energy digital and wireless technology to control operation of the fill valve and assembly.

This disclosure provides the same type of fill valve functionality as conventional fill valves by using low energy digital and wireless technology, hence the use of the word "electronic" in the title of the disclosure. It is desirable that the electronically-operative and digitally-controlled fill valve constructed in accordance with the present disclosure be constructed for use with existing housings to minimize alterations to current housing constructs, making it available as both an OEM and an after-market product.

The invention claimed is:

1. A fill valve for a water storage tank, comprising:
   a riser assembly;
   a valve housing mounted on an upper end of the riser assembly;
   a pilot orifice in the valve housing;
   a sensor coupled to the water storage tank, wherein:
      the sensor comprises:
         a PC board;
         a logic and control module coupled to the PC board; and
         a plurality of rods coupled to the PC board, wherein the plurality of rods further comprises:
            a water over-flow rod;
            a water off rod;
            a water on rod; and
            a ground rod; and
         the sensor determines a water level within the water storage tank; and
   a pilot valve means for opening and closing the pilot orifice in response to the sensor determining the water level in the fill tank.

2. The fill valve of claim 1, wherein:
   the sensor is wirelessly coupled to the PC board; and
   the PC board controls the pilot valve means.

3. The fill valve of claim 1, wherein the pilot valve means further comprises a solenoid to open and close the pilot orifice.

4. The fill valve of claim 1, wherein the pilot valve means further comprises:
   a solenoid; and
   an arm pivotally mounted on the valve housing between the solenoid and the pilot orifice, wherein the arm opens and closes the pilot orifice in response to movement of the solenoid.

5. The fill valve of claim 1, wherein the sensor further comprises:
   a receiver; and
   a transmitter.

6. The fill valve of claim 1, wherein the fill valve further comprises:
   a float housing including a reservoir for holding a battery enclosure;
   a waterproof battery enclosure cover;
   a PC board with a logic and control module; a receiver; and
   a transmitter.

7. The fill valve of claim 1, wherein the fill valve further comprises:
   a sensing and control subassembly; and
   a solenoid subassembly.

8. The fill valve of claim 1, wherein:
   the fill valve includes a micro-processor that creates an alarm signal if water does not reach a predetermined water level in a predetermined period of time; and the alarm signal is at least one of:
an audible alarm; and
a wireless message.
9. The fill valve of claim 1, wherein:
the fill valve includes a micro-processor that creates an alarm signal if water reaches a predetermined high water level in a predetermined period of time; and
the alarm signal is at least one of:
an audible alarm; and
a wireless message.
10. The fill valve of claim 1, wherein:
the fill valve includes a micro-processor, wherein:
the micro-processor learns a normal time period between a flush and a fill; and
the micro-processor creates an alarm signal if the normal time period between a flush and a fill changes; and
the alarm signal is at least one of:
an audible alarm; and
a wireless message.
11. A fill valve for a water storage tank, comprising:
a riser assembly;
a valve housing mounted on an upper end of the riser assembly;
a pilot orifice in the valve housing;
a sensor coupled to the water storage tank, wherein:
the sensor comprises:
a PC board;
a logic and control module coupled to the PC board; and
a plurality of rods coupled to the PC board at a plurality of contact pads, wherein the plurality of rods further comprises:
a water over-flow rod;
a water off rod;
a water on rod; and
a ground rod;
the sensor determines a water level within the water storage tank; and
a solenoid to open and close the pilot orifice in response to the sensor determining the water level in the fill tank, wherein:
the solenoid is coupled to the PC board;
the sensor is wirelessly coupled to the PC board; and
the PC board controls a pilot valve means.
12. The fill valve of claim 11, wherein the sensor further comprises:
a receiver; and
a transmitter.
13. The fill valve of claim 11, wherein the fill valve further comprises:
a float housing including a reservoir for holding a battery enclosure;
a waterproof battery enclosure cover;
a PC board with a logic and control module;
a receiver; and
a transmitter.
14. The fill valve of claim 11, wherein the fill valve further comprises:
a sensing and control subassembly; and
a solenoid subassembly.
15. A fill valve for a water storage tank, comprising:
a riser assembly;
a valve housing mounted on an upper end of the riser assembly;
a pilot orifice in the valve housing;
a sensor coupled to the water storage tank, wherein:
the sensor comprises:
a PC board;
a logic and control module coupled to the PC board; and
a plurality of rods coupled to the PC board at a plurality of contact pads, wherein the plurality of rods further comprises:
a water over-flow rod;
a water off rod;
a water on rod; and
a ground rod; and
the sensor determines a water level within the water storage tank;
a solenoid, wherein:
the solenoid is coupled to the PC board
the solenoid operates the pilot orifice in response to the sensor determining the water level in the fill tank;
the sensor is wirelessly coupled to the PC board; and
the PC board controls a pilot valve means; and
a micro-processor coupled to the sensor, wherein:
the microprocessor creates an alarm signal in the form of at least one of an audible alarm or a wireless message if water does not reach a predetermined water level in a predetermined period of time;
the microprocessor creates an alarm signal in the form of at least one of an audible alarm or a wireless message if water reaches a predetermined high water level in a predetermined period of time; and
the microprocessor creates an alarm signal in the form of at least one of an audible alarm or a wireless message if the normal time period between a flush and a fill changes.

* * * * *